United States Patent [19]

Fulton et al.

[11] 3,713,886

[45] Jan. 30, 1973

[54] ENCAPSULATED MAGNETIC MEMORY ELEMENT

[75] Inventors: Thomas Philip Fulton, Brookline; Henry Di Luca, Waltham, both of Mass.

[73] Assignee: RCA Corporation

[22] Filed: Jan. 15, 1971

[21] Appl. No.: 106,914

Related U.S. Application Data

[62] Division of Ser. No. 825,297, May 16, 1969, Pat. No. 3,640,767.

[52] U.S. Cl. ..........117/234, 117/100 B, 117/106 R, 117/161 ZA

[51] Int. Cl. ..........H01f 1/22

[58] Field of Search....117/235, 234, 161 ZA, 100 B, 117/106 R

[56] References Cited

UNITED STATES PATENTS

| | | | |
|---|---|---|---|
| 3,526,533 | 9/1970 | Jacknow et al. | 117/161 X |
| 3,279,945 | 10/1966 | Haines et al. | 117/234 |
| 3,445,326 | 5/1969 | Hurst | 117/161 X |
| 3,484,333 | 12/1969 | Vanderbilt | 117/161 X |
| 3,598,647 | 10/1968 | Von Alten et al. | 117/234 |
| 3,523,040 | 8/1970 | Lee | 117/234 |
| 3,597,260 | 8/1971 | Segura | 117/161 X |

FOREIGN PATENTS OR APPLICATIONS

| | | |
|---|---|---|
| 850,419 | 10/1960 | Great Britain |

*Primary Examiner*—William D. Martin
*Assistant Examiner*—Bernard D. Pianalto
*Attorney*—H. Christoffersen

[57] ABSTRACT

Encapsulated ferrite magnetic memory cores are disclosed which have a very thin coating of polymerized gamma-aminopropyltriethoxysilane, whereby the cores are organophilic for adhesion to an uncured silicone rubber-coated substrate, are lubricated to minimize friction with wires passed through the holes in the cores, and are hydrophobic to provide moisture repellency of the cores in use in a memory. The cores are encapsulated by shaking a substantial bulk quantity of sintered ferrite memory cores in silane vapor at a temperature of about 220°C in an inert gaseous environment having a known moisture content.

1 Claim, 2 Drawing Figures

ENCAPSULATED MAGNETIC MEMORY ELEMENT

This is a division of application Ser. No. 825,297 filed on May 16, 1969 and now U.S. Pat. No. 3,640,767.

BACKGROUND OF THE INVENTION

In the construction of ferrite magnetic core memory planes, it is known to encapsulate the finally-assembled memory plane including the cores and the threaded wires. The commonly-practiced method of constructing core memory planes involves the adhering of positioned cores on an adhesive-coated sheet, on which the cores are held edge-up for the threading of wires through the cores. The known adhesive coatings for this purpose have been either deficient in their adhesive properties, or have been disadvantageous in so rigidly supporting the cores that the fragile cores are susceptible of being damaged. It is therefore an object of the present invention to provide for the encapsulation of ferrite magnetic cores at the original bulk quantity stage for the purpose of facilitating the incorporation of the cores in an assembled memory plane, and for the purpose of providing environmental protection of the cores in the resulting memory plane when incorporated in an operating computer memory.

SUMMARY OF THE INVENTION

A substantial bulk quantity of sintered ferrite memory cores are subjected to vibration or shaking in the presence of silane vapor, at a temperature of about 220°C, and in an inert gaseous environment having a known moisture content. The treatment is continued for about ten minutes. The resulting ferrite cores are characterized in having all surfaces uniformly coated with polymerized silane to a thickness of about a few hundred molecules.

DESCRIPTION OF THE PREFERRED EMBODIMENT

Figure 1:
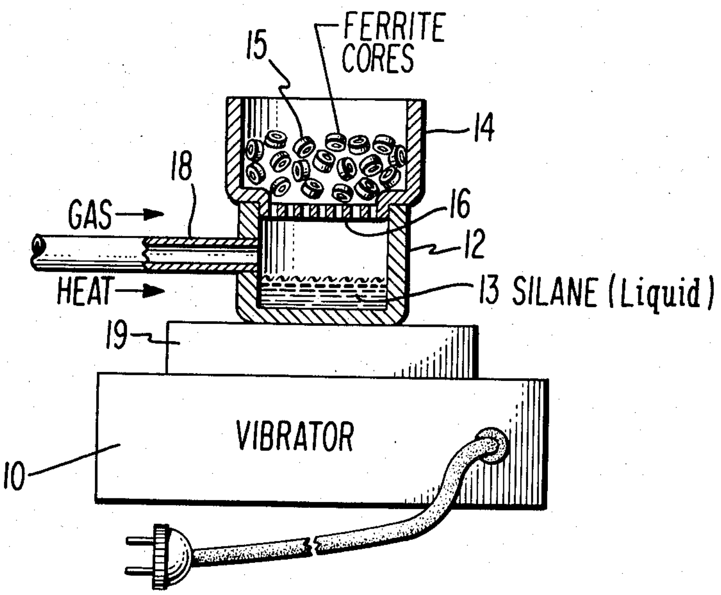
FIG. 1 is a diagram of apparatus useful in the method of encapsulating a bulk quantity of magnetic cores according to the present invention.

Reference is now made to FIG. 1 for a description of a method of priming ferrite magnetic cores to ensure their subsequent adhesion to a silicone rubber coating on a flexible sheet. The apparatus shown includes a conventional electrically-operated vibrator 10, a liquid container 12 resting on and vibrated by the vibrator 10, and a core container 14 nested on top of the liquid container 12. The core container 14 has a perforate bottom 16 to permit the free passage therethrough of vapor from the liquid container 12. The liquid container 12 includes a pipe connection 18 through which an inert gas of known moisture content is supplied. Provision is also made for the supplying of heat to the liquid container 12. The heat may be supplied by heating the gas fed to the container through the pipe 18. Alternatively, the supporting member 19 may include a heating element for heating the liquid in the container 12.

In the operation of the apparatus shown in FIG. 1, a measured quantity, such as 10 cc, of an organosilicon liquid is poured into the liquid container 12. The preferred liquid is a silane, specifically gamma-aminopropyltriethoxysilane sold by General Electric Co. under designation GE-SE-3900. Typical properties of the silane are as follows:

| | |
|---|---|
| Molecular weight | 221.3 |
| Specific Gravity (25/25°C) | 0.943 |
| Color (APHA max.) | 25 |
| Purity (% min.) | 98% |
| Ester Content | 0.8% maximum |
| Flash Point | 104°C |
| Boiling Point | 217°C |
| Temperature at vapor pressure of 50 mm Hg | 141°C |
| Refractive Index | 1.4190 |
| Soluble in acetone, benzene, carbon tetrachloride, ethyl acetate, ethyl ether, hexane, trichloroethylene. Soluble and reactive with methyl alcohol, isopropyl alcohol, water. | |
| Corrosivity | non-corrosive to most metals. |

A bulk quantity of cores, such as 1 or 2 million cores, is loaded into the core container 14. The cores may have an outer diameter of 0.030 inch and an inner diameter of 0.018 inch. Nitrogen gas having a known moisture content is fed through the pipe 18 to the liquid container 13, from which it escapes through the core container 14 to an exhaust hood (not shown). The nitrogen may be a commercial grade having a moisture content of from zero to 1000 parts per million. The nitrogen flow may be at the rate of about 45 liters per minute. Heat may be applied to the silane liquid 13 by perheating the gas supplied through pipe 18. The temperature in the liquid container 13 is preferably about 220°C, which may be achieved by preheating the gas to a sufficiently-higher temperature to allow for heat losses in pipe 18. The heat applied to the silane liquid causes it to vaporize and pass in vapor form up through the cores in the core container 14. The entire assembly is vibrated by the vibrator 10 in order to prevent the ferrite cores 15 from sticking to each other and to ensure an even exposure of all surfaces of all cores to the silane vapor.

The thickness of the silane coating deposited on the ferrite cores 15 is determined by the amount of moisture present on the cores themselves due to normal environmental humidity, and the amount of moisture present in the gas supplied under pressure to the liquid container 12, and, of course, also on the length of time that the cores are subjected to the silane vapor. The cores will normally be coated to a thickness of perhaps 100 or 200 molecules of polymerized silane in a period of about 10 or 15 minutes, during which time all of the 10 cc of silane liquid is vaporized at the temperature of 220°C.

Figure 2:
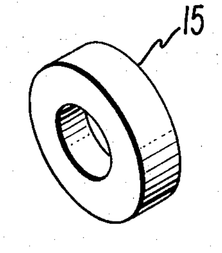
FIG. 2 is a perspective view of an individual ferrite magnetic core according to the present invention.

FIG. 2 is a perspective view of an individual ferrite magnetic core 15 as it appears both before being encapsulated and also after being encapsulated. An individual core may have an outer diameter of 0.030 inch or less. The polymerized silane coating on all surfaces of the cores is so thin as to not increase the dimensions of the core. The polymerized silane preferably has a thickness of only a few hundred molecules of silane.

The encapsulated magnetic cores as shown in FIG. 2 are organophilic, by which is meant that the surfaces of the core are fully adapted for adhesion to a silicone rubber-coated substrate. An encapsulated core having its edge pressed onto an uncured silicone rubber-coated support is held in place with an adhesive force sufficiently great to permit transferring the support with adhered cores to an oven in which the rubber is cured. The cores are then adhered to the cured silicone rubber with a force such that a pull-tester connected to a single core registers a force of about from 5 to 30 grams before the core is separated from the rubber coating. The adhesion is such as to cause the cores to return to their aligned positions after being displaced in any direction. This property is very useful during the subsequent steps of assembling a memory plane.

The encapsulated cores have the surface quality of being lubricated. This is distinctly advantageous in minimizing the friction with wires passed through holes in the cores. The stringing of wires through the cores is thus facilitated, and the danger of damaging a fragile core or wire is greatly reduced.

The encapsulated cores are also hydrophobic, by which is meant that the surface pores of the sintered ferrite core are substantially sealed against environmental moisture. This property of the cores is advantageous at all stages in the manufacture of core memory plane, and at all stages in the ultimate use of the memory plane in a computer memory.

Encapsulated ferrite cores have many practical advantages which are evident during the memory construction process, and also during operation of the final resulting memory system. The cores are conveniently encapsulated in their sintered bulk quantity state in a manner which is readily and economically accomplished by the method described.

What is claimed is:

1. An article of manufacture comprising a sintered magnetic ferrite memory core having all surfaces thereof uniformly coated with polymerized gamma-aminopropyltriethoxysilane having a uniform thickness in the order of a few hundred molecules.

* * * * *